United States Patent [19]

Aubry et al.

[11] Patent Number: 4,798,614
[45] Date of Patent: Jan. 17, 1989

[54] PROCESS AND DEVICE FOR COOLING

[75] Inventors: Nestor Aubry, Brussels; Armand Couder, Zaventem; Andre Weverbergh, Overijse, all of Belgium

[73] Assignee: Messer Griesheim GmbH, Frankfurt, Fed. Rep. of Germany

[21] Appl. No.: 29,258

[22] Filed: Mar. 23, 1987

[30] Foreign Application Priority Data

Mar. 25, 1986 [BE] Belgium .................................. 904485

[51] Int. Cl.$^4$ ............................................ F25D 17/02
[52] U.S. Cl. ........................................ 62/374; 62/381
[58] Field of Search ...................... 62/63, 64, 374, 381

[56] References Cited

U.S. PATENT DOCUMENTS

| | | | |
|---|---|---|---|
| 1,747,080 | 2/1930 | Reeh | 62/381 |
| 2,441,376 | 5/1948 | Stiening | 62/381 |
| 3,368,366 | 2/1968 | Keeling | 62/381 |
| 3,507,128 | 4/1970 | Murphy et al. | 62/63 |
| 3,797,272 | 3/1974 | Huey | 62/381 |
| 3,952,757 | 4/1976 | Huey | 62/381 |

Primary Examiner—Ronald C. Capossela
Attorney, Agent, or Firm—Connolly & Hutz

[57] ABSTRACT

Products to be cooled are brought in the form of individual portions at least partially into contact with a refrigerant liquid for a sufficient time so that the liquid is almost completely evaporated when the portion has reached its required cooling temperature.

11 Claims, 1 Drawing Sheet

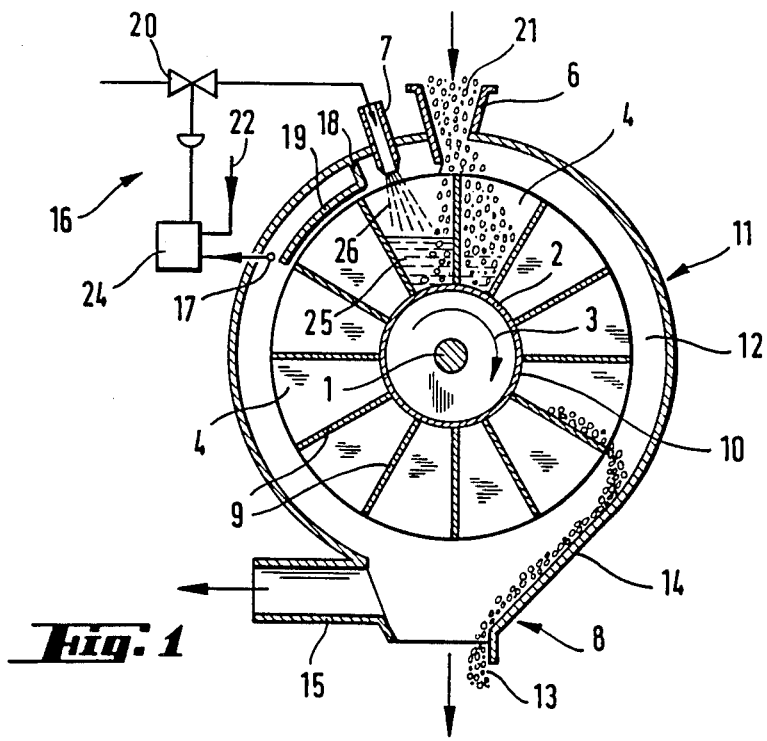
Fig. 1
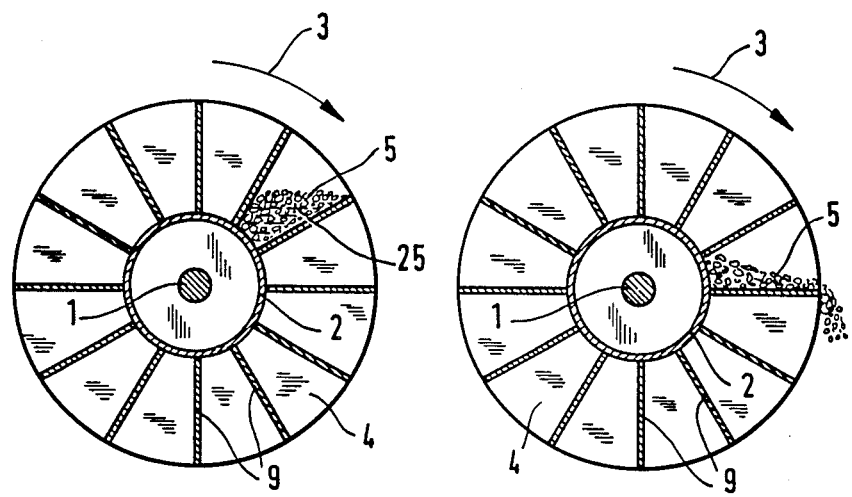
Fig. 2
Fig. 3

4,798,614

PROCESS AND DEVICE FOR COOLING

BACKGROUND OF INVENTION

The invention concerns a process for refrigerating, and especially for quick freezing, of products such as foodstuffs and industrial raw materials, by means of a refrigerant liquid such as a cryogenic fluid.

There are generally two principal techniques in use today for quick freezing of foodstuffs: dip freezing and tunnel or spiral freezing.

Dip freezing has the considerable disadvantage of a relatively high consumption of cryogenic fluid, whereas tunnel or spiral freezing requires substantial investment and the systems used generally require a great deal of space.

In addition, both of these existing techniques have a comparably limited flexibility, and it is difficult to adapt a particular system to varying quick freezing requirements.

SUMMARY OF INVENTION

The invention has as its primary aim the elimination of these various disadvantages, and the proposal of a process that it easily controllable and is therefore suitable for the most widely differing refrigerating tasks with the greatest variety of products.

For this purpose the product to be refrigerated is brought in portionized quantities into at least partial contact with a specific quantity of the aforementioned fluid, with the contact time between a single portion and this fluid on the one hand, and the quantity of the latter on the other, bring so selected that the fluid is preferably nearly totally evaporated at the moment in which the portion concerned has reached the desired cooling temperature.

It is desirable for the product to be cooled to be at least partially dipped, in portion-sized quantities, into a specified quantity of the aforementioned refrigerant liquid.

In addition the invention concerns a device for refrigeration, especially deep freezing, of such products as foodstuffs and industrial raw materials by means of a refrigerant liquid, and especially with a device for the use of the process described above.

This device is characterized by having a transitory transport mechanism, which is movable in a specified direction and on which a number of successive open-top compartments are situated, in each of which a portion of the product to be cooled can be placed. Shortly after the beginning of the transport mechanism a device for loading the products to be cooled into the aforementioned compartments on the one hand, and for the refrigerant liquid on the other, is provided, as well as a removal device for the frozen products shortly before the end of the transport mechanism.

In a particular version of the invention the transport mechanism has a drum rotating in a specified direction on its axle, in which a number of axially extending partitions are provided which are distributed approximately equally over the cylinder wall of the drum and which thereby make up nearly identical successive compartments along this wall.

In a preferred version of the invention, the drum rotates on its axle in a nearly coaxial, at least partially circular housing, the diameter of which is somewhat greater than that of the partition-equipped drum, and so mounted that between the housing and the free end of the partitions a ring-shaped space is created, through which the evaporated refrigerant liquid can escape from the compartments. The loading device for the refrigerant liquid and the loading device for the products to be cooled in the compartments are located on the top of the housing, and the removal device for the cooled products is nearly diametrically opposite on the bottom of the housing.

THE DRAWINGS

FIG. 1 is a vertical cross-section of a device for product refrigeration constructed in accordance with the invention;

FIG. 2 is a cross-section of a movable part of the invention in another position; and FIG. 3 is cross-section of the same moving part, as in FIG. 2 is in still another position.

DETAILED DESCRIPTION

The invention concerns a process for refrigerating, and especially deep freezing, of products such as foodstuffs and industrial raw materials, by means of a refrigerant liquid such as liquid nitrogen, which consists primarily therein, that the products to be cooled are brought, in the form of portionized quantities, into at least partial contact with a specified quantity of the aforementioned liquid, with the contact time between a specific portion and this liquid on the one hand, and the quantity of the latter on the other, being so selected that the liquid is preferably nearly totally evaporated at the moment in which the portion concerned has reached the desired cooling temperature.

It is generally preferred—especially in deep freezing—to at least partially dip the portions in a certain quantity of a cryogenic fluid.

In some cases the refrigerant liquid is applied to the specified products in the form of fine droplets in order to assure a close contact between the products to be cooled and the fluid. This is done preferably during the loading and/or portionizing of these products.

Since deep freezing is to be considered an important application of the process of this invention, this specific application is illustrated in detail in FIGS. 1 and 3, which display a preferred device for the application of the process described in summary above.

This devices has a transport mechanism, which consists of a drum 2 rotating on its axle 1 in the direction indicated by the arrow 3. On this drum there are a number of successive compartments 4 provided, into each of which a portion 5 of a product to be frozen can be placed.

At the beginning of this transport mechanism, which in this specific version is located on the top, there is a loading device 6 for the product to be frozen 21 and a further loading device 7 for the refrigerant liquid, which consists of a cryogenic fluid 26. As the end of the transport mechanism there is a removal device B for the frozen product, which in this specific version is located at the bottom, nearly diametrically opposite the loading device 6.

Relative to the direction of motion 3 of the drum 2, the loading device 7 for the cryogenic fluid is located before the loading device for the product to be frozen 13.

The compartments 4 on the drum 2 are created by a number of axially radiating partitions 9, which are distributed approximately equally along the cylinder wall 10 of the drum.

Further, the drum 2, which can be rotated on its axle 1, is placed in a coaxial, at least partially cylinder-shaped housing 11, the diameter of which is somewhat greater than the diameter of the drum 2 equipped with partitions 9, so that between the housing 11 and the free end of the partitions 9 a ring-shaped space 12 is created through which the evaporated cryogenic fluid can escape from the compartments 4.

The loading device 6 for the product to be frozen 21 and the loading device 7 for the cryogenic fluid are also located on the top of the housing 11, while the removal device 8 for the frozen product 13 is located on the funnel-shaped bottom 14 of the housing 11.

On the side of this funnel-shaped bottom 14 is an evacuation duct 15 for the vaporized cryogenic fluid, which is connected to a fan which is not depicted.

The loading device 7 for the cryogenic fluid consists in this specific version of one or more spray heads 20 which are arranged in the housing 11 over the compartments 4.

A regulatory system 16 for determining the quantity of cryogenic fluid for each portion of the product to be frozen is also provided.

This regulatory system 16 includes a temperature probe 17 which is located before the loading device for the cryogenic fluid in the housing 11, in a position which is protected in the directed of this loading device 7 by a plate 18.

This plate 18 can if necessary be equipped with an extension 19, as is depicted in FIG. 1, which is in close contact with the compartments and thereby prevents vapor of the cryogenic fluid from passing directly from the loading device 7 to the position where the temperature probe 17 is located, and is thus evacuated directly through the duct 15.

This temperature probe 17 regulates a control valve 20, which in turn regulates the amount of cryogenic fluid delivered to the loading device 7.

In addition to the temperature probe 17 there is also a detector which is not depicted for measuring the delivered quantity of the product to be frozen 21 to the compartments 4, and for regulating the quantity of cryogenic fluid 26 delivered to the loading device 7, depending on the delivered quantity of product to be frozen 21.

The loading of the product to be frozen 21 is preferably done continuously, for example in bulk loads, and is distributed automatically to the compartments 4 in portions 5 by the drum 2 rotating on its axle 1, with an exactly determined quantity of cryogenic fluid 25 preferably being previously deposited in each compartment, in which these portions are at least partially dipped.

The deposit of this quantity of cryogenic fluid in the compartments 4 can in some cases be carried out simultaneously with the deposit of the product to be frozen, or even shortly thereafter, so that this is sprinkled with the fluid. In the latter case the product to be frozen is not necessarily dipped in the cryogenic fluid.

Finally, it should be mentioned that the axle of the drum should preferably be driven by a controllable-speed motor, depending for example on the required quantity of cryogenic fluid for each portion.

The working principle of the device depicted in the graphic figures can be described as follows:

The space enclosed by the housing 11 is first re-cooled, with the pre-cooled temperature, which is measured by the temperature probe 17, being a function of the degree of refrigeration required for each unit of the frozen product.

The product to be frozen 21 is then delivered continuously on the top of the housing 11 through the funnel-shaped loading device 6 and distributed in portions to the compartments 4 of the drum 2 rotating on its axle 1 in direction 3.

As soon as the non-depicted detector has registered the passage of the product to be frozen 21 to the loading device 6, an output signal is conducted over the cable 22 and the control element 24 to the control valve 20, which permits a regulation of the delivered quantity of cryogenic fluid 26 to compartment 4, located a short distance in front of the position to which the product to be frozen is delivered, in such a manner that at the moment in which the product to be frozen is deposited in a compartment, this is already partially filled with cryogenic fluid, as can be clearly seen in FIG. 1. During further rotation of the drum 2 in direction 3, the cryogenic fluid evaporated gradually, and the cold units of the latter are thus transferred to the product to be frozen.

The quantity of cryogenic fluid 25 deposited in the individual compartments is such that at the moment in which a certain portion of the product to be frozen is removed from a compartment 4, as is depicted in FIG. 3, nearly the entire quantity of cryogenic fluid in this compartment has evaporated.

The rotation speed of the drum, the temperature probe 17, and if necessary the hot-depicted detector, which affect the control element 24 which regulates the control valve 20, determine the quantity of cryogenic fluid deposited in the individual compartments 4 by the spray head or heads 7, in such a way that the cryogenic fluid still remaining at the moment in which a portion is removed from a specific compartment is practically nonexistent.

The products frozen in this manner 13 are then carried off through the funnel-shaped removal device 8 at the bottom of the housing 11, while the not-depicted fan evacuates the vapor of the cryogenic fluid through the duct 15.

In certain cases these frozen products will be sprinkled with water on a not-depicted conveyor belt, which will then freeze around the product, thus forming a protective layer. This is actually a known technique, called "glazing".

The invention is as follows further illustrated by some specific application examples.

The goal of the first two examples is the glazing of grey shrimp, scampi, squid, Baltic shrimp, etc.

This glazing is done by first deep freezing the product to such a temperature that the stored cold units are sufficient to convert a certain quantity of water surrounding the product to ice, in such a manner as to protect the frozen product completely from the air.

EXAMPLE 1

In the first step, shrimp are deep frozen with a known dip freezing device with chlorinated hydrocarbon, especially "Freonp", (chlorinated and fluorinated hydrocarbon) and thereafter glazed, so that there is an increase in weight of 15% of the end product.

The temperature at the entrance of the dip freezing device is −10 degrees C.. The quantity of the finished product amounts to 572 kg/h, including 15% ice, or 486 kg of product plus 86 kg ice. In a second step the products which have in this manner been partially glazed will then be placed in a device in accordance with FIG. 1. After further deep freezing, they are again glazed in a production quantity of 66 kg/h including 94 kg ice, which is a total glaze percentage of 180/666×100=27% The partial glazing amounts to (666−572)/666=14%.

The consumption of liquid nitrogen amounted to 592 kg/h, or 0.89 kg liquid nitrogen per kg of end product, or 1.3 kg liquid nitrogen per kg of treated pre-glazed product.

EXAMPLE 2

In a first step shrimp are deep frozen in a known dip freezing device with chlorinated hydrocarbon, especially "Freon" (chlorinated and fluorinated hydrocarbon) and thereafter glazed, so that there is a weight increase of 15% of the end product. The temperature at the entrance of the dip freezing device is −10 degrees C. The quantity of delivered product amounts to 887 kg/h including 15% ice, or 754 kg product plus 133 kg ice.

In a second step the products thus glazed are then placed in a device in accordance with FIG. 1, where they are deep frozen in such a way that a product shall be retained that does not stick together.

The consumption of liquid nitrogen amounted to 420 kg/h, or 0.47 kg liquid nitrogen per kg of treated, non-glazed product.

EXAMPLE 3

This concerns a process for cold-grinding rubber, which primarily comes from production waste or from the tread surface of old automobile tires.

In this specific example a raw material is assumed which consists of strips with the approximate dimensions of 30 mm in length, 200 mm in width, and 15 mm in thickness. This raw material must be ground so that a product with the following specifications is achieved:

90% with a diameter under 400 um
67% with a diameter under 315 um
30% with a diameter under 250 um
21% with a diameter under 200 um The strips are first pre-ground in a knife mill to a granulate of 6×6 mm. A known knife mill with a performance rating of 30 kW is used, in which the grinding is done at normal temperature with no nitrogen cooling. The granulate is then frozen with liquid nitrogen in a device as depicted in FIG. 1. The relative production quantity of this granulate and the consumed liquid nitrogen is so regulated that the granulate leaves the device at a temperature on the order of magnitude of −90 to −100 degrees C. Afterwards the thus frozen granulate is further ground in a disk mill to the desired grain size. A well-known mill is used for this, which is equipped with two counter-rotating cogged disks, between which the milling process occurs. Finally, this very finely ground granulate, at an increasing temperature of −60 to nearly −15 degrees C., is transported pneumatically to a sorting device, where it is separated into a product with more than 500 um diameter and a product with less than 500 um diameter. The temperature of these two products is generally on the order of magnitude of 0 degrees C.

The invention is of course in no way limited to the above described versions, and in the framework of the applied for scope of protection several modifications can be considered, among others with regard to the construction and dimensions of the parts of which the device consists.

The compartments can for example be made up to tipping containers, which are rotatable around a turning joint to the cylinder wall of the drum and which can only be emptied at the height of the removal device. This can if necessary, as opposed to a device with fixed compartments, have the advantage that if required a relatively greater quantity of refrigerant liquid per compartment can be provided, since this liquid must first be evaporated when the drum has completed a rotation of 180 degrees, while with the described version, the entire quantity of cryogenic fluid must already have been evaporated after a rotation of approximately 90 degrees. On the other hand, one can argue that with this altered version the contact time for the same rotation speed of the drum is relatively considerably longer.

In some cases the transport mechanism can also be formed by a conveyor belt, on which the compartments are located, for example in the form of fixed containers.

Finally, for example when the cooling remains above the deep freezing temperature, a refrigerant liquid can if necessary be used which must not necessarily be evaporated at the moment in which the desired cooling temperature is achieved. In this case the used, not evaporated refrigerant liquid can if desired simply be returned.

What is claimed is:

1. In a device for cooling, expecially deep freezing, of products such as foodstuffs and industrial products by means of a refrigerant liquid, the improvement being in a transport mechanism, said transport mechanism comprising a drum rotatably mounted on an axle in a particular direction, a plurality of radially extending partitions in said drum dividing said drum into a number of compartments, a product loading device disposed above said drum for feeding the products to be cooled into said compartments as said drum is rotating, a refrigerant liquid loading device for feeding refrigerant liquid into said compartments to mix with the products therein, and a removal device downstream from said loading devices for receiving the cooled products discharged from said drum before said drum makes a complete revolution.

2. A device according to claim 1, characterized by said loading device for the refrigerant liquid being positioned before said loading device for the product to be cooled relative to the direction of motion of the transport mechanism.

3. A device according to claim 1, characterized by an evacuation fan located shortly before the end of said transport mechanism to evacuate the evaporated refrigerant liquid.

4. A device according to claim 1, characterized by said loading device for the refrigerant liquid consisting of at least one spray head which is mounted above said aforementioned compartments.

5. A device according to claim 1, characterized by a detector for measuring the quantity of product to be cooled delivered to said compartments and for regulation of the quantity of refrigerant liquid delivered to said compartments depending on the delivered quantity of product to be cooled.

6. A device according to claim 1, characterized by said partitions being distributed approximately equally around the cylinder wall of said drum, to thereby make up nearly identical successive compartments along said wall.

7. A device according to claim 6, characterized by said drum being mounted in a nearly coaxial at least partially cylinder-form housing, the diameter of said housing being greater than said drum equipped in such a manner that between said housing and the free end of the partitions a ring-shaped space is created through which the evaporated refrigerant liquid can escape from said compartments, and said loading device for the refrigerant liquid and said device for loading the compartments with the product to be cooled being located on the upper side of said housing, and said removal device for the cooled product being diametrically opposite on the bottom side of said housing.

8. A device according to claim 7, characterized by a control system for determining the quantity of refrigerant liquid for each portion of the product to be cooled, with at least one temperature probe located in the space in which said transport mechanism moves before said loading device for the refrigerant liquid in a position protected from said loading device with said temperature probe regulating a control valve which regulates the quantity delivered to said loading device for the refrigerant liquid.

9. A device according to claim 8, characterized by a plate mounted to said housing adjacent said drum, and said plate having an extension extending along said drum for protecting said probe from the refrigerant liquid.

10. A device according to claim 7, characterized by an evacuation duct for the evaporated refrigerant liquid being connected to said housing near said removal device.

11. A device according to claim 6, characterized by said axle of said drum being driven by a controllable-speed motor.

* * * * *